United States Patent Office 2,700,224
Patented Jan. 25, 1955

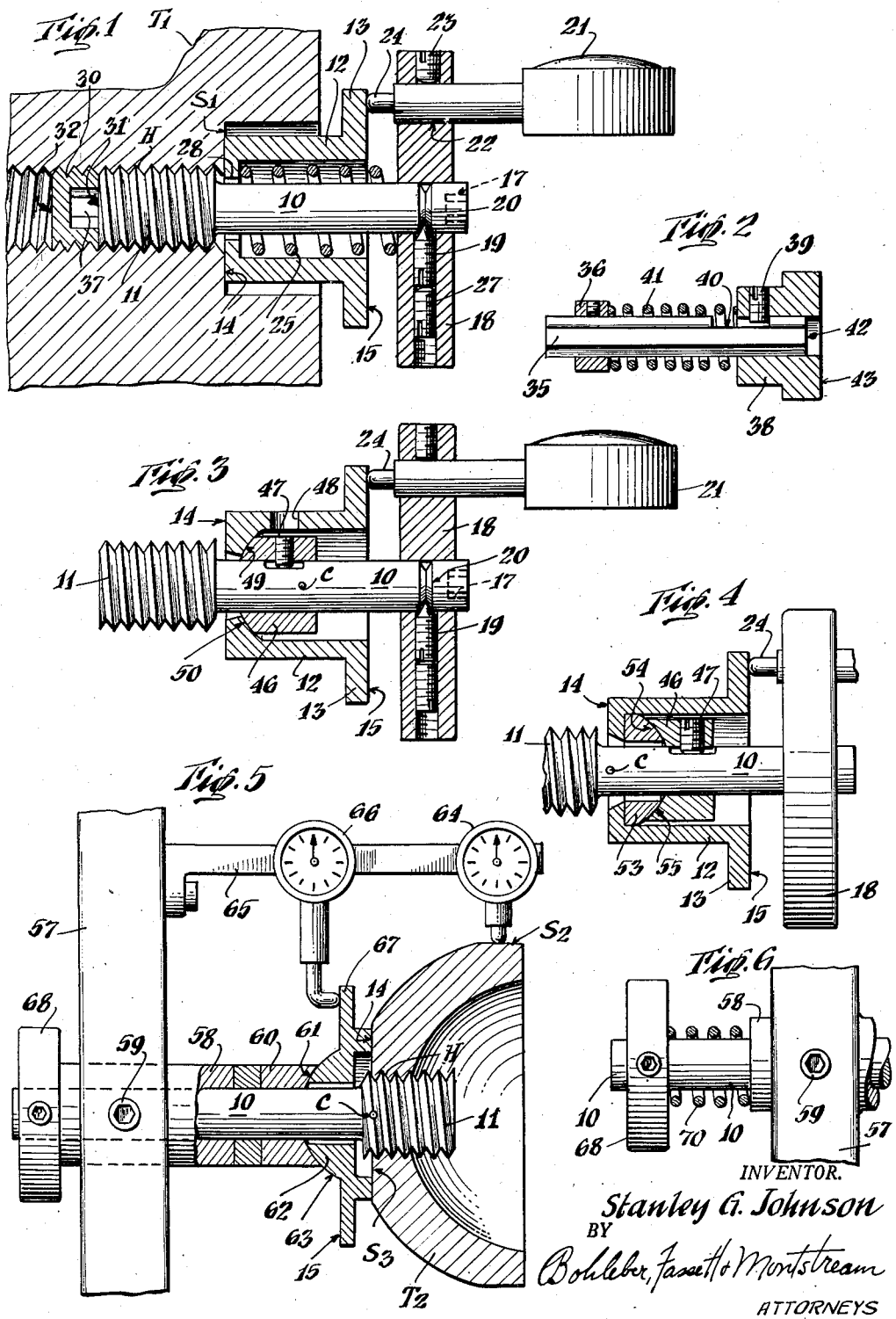

2,700,224

GAUGE FOR TESTING SQUARENESS OR CENTRICITY OR BOTH WITH RESPECT TO INTERNAL THREAD

Stanley G. Johnson, West Hartford, Conn., assignor, by mesne assignments, to The Johnson Gage Development Company, a corporation of Connecticut Application February 3, 1953, Serial No. 334,825

11 Claims. (Cl. 33—199)

The invention relates to a simple and inexpensive gage for testing the squareness of a surface or the centricity of a cylindrical surface or both of a test piece with respect to an internal thread in the test piece. The gage may be constructed so that it will test the squareness of a surface or face with respect to the internal thread when the surface is at the bottom of a hole or recess such as a countersink from which the internal thread extends.

It is an object of the invention to construct an inexpensive and efficient gage for testing the squareness of a flat surface of a test piece or the centricity of a cylindrical surface thereon or both conditions with respect to an internal thread in the test piece.

Another object is to construct a gage for testing the squareness of a flat surface at the bottom of a hole in a test piece with respect to an internal thread extending from the hole.

Another object is to construct a simple and inexpensive gage for the above purposes.

Other objects of the invention will be apparent from the following description when taken in connection with the accompanying drawing illustrating some preferred embodiments of the gage in which:

Figure 1 shows a gage for determining the squareness of a surface at the bottom of a recess with respect to an internal thread in a hole extending from said surface;

Figure 2 is a simple tool for inserting a stop or pressure nut in the threaded hole;

Figure 3 is another form of gage similar to that of Figure 1;

Figure 4 shows the gage of Figure 3 modified slightly;

Figure 5 shows the gage as it may be used for determining the centricity of a cylindrical surface with respect to a threaded hole in the test piece; and Figure 6 shows a portion of a gauge similar to Figure 5 utilizing a spring for exerting axial pressure on the stem of the gage;

Heretofore it has been an awkward procedure to determine the squareness of a recessed surface from which a threaded hole extends with respect to the internal thread extending from the bottom of the recess. In addition, because of the limited space within which to perform the gaging operation, various things could go wrong so that the accuracy of the test by prior methods was not assured. Even external surfaces where working space is limited, present a difficult gaging problem. Frequently too, the surface to be tested was in a large and heavy piece so that the gages had to be moved to the work and in such case the light easily portable gage of the invention has many advantages. With the gage herein the determination or gaging of squareness and/or centricity of a surface with respect to an internal thread may be more easily accomplished and accurate results are secured.

A test piece or part T1 is a portion of some piece of equipment, which may be large and heavy, having an internal thread or threaded hole H therein. The hole extends from the bottom of a recess having a flat surface S1, the squareness of which with respect to the thread H is important and must be determined. The gage includes a stem 10 having a thread or threaded portion 11 thereon which is the same as that of the internal thread. A collar 12 is received on the stem having a flange 13. In the particular construction of Figure 1, the collar is so constructed that one end face or contact face 14 thereof is parallel with another or an indicator face 15 which in the gage of Figure 1 is the face at the end of the collar.

Means are provided to mount an indicator on the stem which is shown as a disk 18 which is rotatably retained on the end of the stem in any suitable way such as by a screw 19 having a pointed end which is received in a V groove 20 carried by the stem so that the disk will turn on the stem. The screw 19 is sufficiently tight or has sufficient drag so that the thread on the stem can be threaded into the threaded hole after which the disk can be rotated on the stem without axial looseness or play. If desired a socket 17 or other means may be provided for independently turning or threading the stem into the internal thread. An indicator, such as a dial indicator 21, is suitably mounted on the disk, the mounting shown being a hole 22 extending through the disk and the indicator is secured therein by a set screw 23. The indicator contact 24 engages the indicator surface or face 15 of the collar.

A spring 25 is received over the stem and engages the collar or an internal flange 28 thereof, the other end engaging the face of the disk 18. The collar 12 is mounted loosely on the stem so that the collar can adjust itself angularly with respect to the stem with the face 14 in flat contact with the surface S1 of the test piece. The mounting of the collar on the stem is a form of universal joint mounting.

In using the gage the thread 11 of the stem is threaded into the hole such as by turning the disk 18. There is sufficient drag between the screw 19 and the groove 20 to turn the same into the hole until the contact surface or end 14 of the collar engages the surface S1 of the test part. The spring 25 holds the contact surface of the collar against the surface S1 so that it assumes any angularity of the latter. The indicator surface 15 of the collar is therefore parallel with the surface S1. Sufficient resistance or friction is provided so that the collar 12 is held stationary although turning of the collar does not affect the gaging of squareness of the surface S1. Continued turning of the disk 18 now rotates the same on the end of the stem and in rotating, the dial indicator 21 is carried therewith and the gage point 24 rides over the indicator surface 15. Any variation in the reading of the dial indicator measures the out-of-squareness of the end face 15 and hence of the surface S1 with respect to the internal thread. The indicator face 15 is actually the surface gaged; however, by so doing the squareness of the parallel surface S1 of the test part is also gaged.

The spring 25 puts pressure on the threads 11 of the stem which aids in centering the stem threads with the internal threads H which pressure would be adequate if the spring were a relatively strong one. Preferably, however, the spring is relatively weak so that it may be desirable to apply some additional pressure between the threads 11 of the stem 10 and the internal thread in order to assure that the stem thread properly alines itself axially with the internal thread H. A stop screw 30 in such case may be threaded down in the hole and the face 31 thereof should be reasonably square with its thread and also the end 32 of the stem 10 should be reasonably square with its thread. When the stem is threaded down into the hole, its end abuts the end of the stop screw and provides sufficient pressure between the threads to bring the two into axial alinement. Either the spring or the stop screw or both therefore provide means for exerting pressure on the stem thread 11.

The spring has three functions therefore: first, of mounting the collar 12 loosely or for angular adjustment so that it may adjust itself to any angularity of the surface S1 with respect to the stem; secondly, of exerting axial pressure between the threads so that the stem thread comes into axial alignment with the internal threads which in the construction of Figure 1 is assisted by the stop screw 30; and thirdly, by allowing the contact surface 14 to adjust itself to any angularity of the test surface S1, it prevents any unequal pressure on the stem which might otherwise force the stem thread out of alinement with the internal thread as could occur if these two surfaces were angularly disposed with respect to each other.

The stop screw should be threaded down into the hole H approximately the proper distance and in order to secure this a tool for this purpose is shown in Figure 2. This tool includes a hexagonal rod 35 having a collar 36 secured thereto. The hexagonal rod 35 fits the hexagonal recess 37 in the stop screw. A turning collar 38 is slidably retained on the rod 35 by a set screw 39, the end of which engages in a long recess 40 in the rod. A spring 41 extends between the collar 36 and the turning collar 38.

In order to insert the stop screw 30 it is placed upon the end of the hexagonal rod 35 and the turning collar 38 is turned to screw the stop screw into the hole H. The face of the turning collar 38 is held against the surface S1 of the test part and when the end 42 of the hexagonal rod is flush with the end 43 of the turning collar the stop screw 30 is at the proper depth. Now when the stem 10 of the gage is threaded into the hole H, its end abuts the stop screw and places sufficient pressure on the threads 11, which needs only slight tightening, so that the stem 10 is brought into axial alinement with the internal thread H in the hole.

In the construction of Figure 3, the spring 25 is dispensed with. Instead, a collar 46 is secured to the stem 10 such as by a set screw 47 which may be tightened through a hole 48 in the gage collar 12. The end 49 of the collar 46 has a spherical surface or segment which engages a spherical surface or segment 50 carried by the gage collar 12 to form a ball and socket means or joint. The collar 12 will adjust itself so that the end 14 will engage flatly against the surface S of a test part the squareness of which is to be determined.

When the threaded portion 11 of the stem 10 is threaded into the internal thread by turning the indicator mounting means or disk 18, the face 14 of the gage collar 12 engages the test surface S1 and by virtue of the ball and socket connection or joint, the collar 12 angularly adjusts itself with respect to the test surface. Sufficient, although light, pressure is put on the thread 11 of the stem 10 so that it centers itself with respect to the axis of the internal thread H. It will be noted, therefore, that the ball and socket means serves three functions; first, it permits angular adjustment of the collar with respect to the stem to conform in position with the surface to be tested; secondly it puts pressure upon the stem thread 11 so that it alines itself axially with the internal thread in the hole; and thirdly it prevents the stem or the stem threads from being misalined with the internal threads which could occur if the angular adjustment were not provided and either of the surfaces was not square. Continued rotation of the disk 18 turns the dial indicator 21 with respect to the indicator surface 15. Although the surface 15 is the surface actually gaged, it is parallel with respect to surface 14 and hence parallel with the surface S1 of the test part. Any variation in the reading of the dial indicator is, therefore, a measure of the out-of-squareness of the surface S1 with respect to the internal thread H.

The gage of Figure 3 is satisfactory; however, it would be a little more accurate if the ball and socket means or joint has its center C in, or approximately in, the plane of the surface 14 of the gage collar 12 as shown in Figure 4. In order to secure this, a collar 53 is inserted into the gage collar 12 which has a spherical surface or segment 54 which cooperates with a spherical surface or segment 55 of the collar 46. The spherical surfaces or segments have their center at C which is or approximately is in line with the surface 14 which permits the gaging collar 12 to adjust itself to the surface being tested or gaged but the collar swings on the center C. In this construction too, the ball and socket means has the three functions enumerated above.

The gage may be used to determine the centricity, i. e. the eccentricity or concentricity of a surface S2 carried by a test part T2 with respect to an internal thread H carried by the test part. In this construction the gage may be secured to a base 57 but having the stem 10 rotatably mounted upon the base by projecting through a bushing 58 which is secured to the base such as by a set screw 59. A collar 60 is mounted on the stem having a spherical segment or surface 61 and a collar 62 is loosely received on the stem 10 and has a spherical segment or surface 63 which engages the spherical surface 61 to form a ball and socket means or joint. The test part T2 has an internal thread H into which the threads 11 of the stem 10 are threaded until the test part engages the collar 62 which exerts sufficient pressure between the threads so that the internal thread of the test part T2 is brought into axial alinement with the stem threads 11. A relatively light pressure accomplishes the alinement. The ball and socket means permits the collar 62 to angularly adjust itself with respect to the stem so that its contact surface 14 may flatly contact the surface S3. Such flat engagement assures that the threads will be brought into alignment whereas if contact was on one side only the uneven pressure would probably misaline the threads. The stem 10 is turned with the disk 68 which also turns the test part or the latter may be turned. An indicator 64 secured to the base 57 by a bracket 65 determines the eccentricity or concentricity of the surface S2 with respect to the internal thread. An indicator 66 may also be used to engage the face 15 of the flange 67 to test the squareness of the surface S3 with respect to the internal thread.

Figure 6 shows the form of gage shown in Figure 5 in which a spring 70 is provided between the end of the bushing 58 and the disk 68 to provide spring pressure between the stem thread 11 and the threaded hole H. In other respects it is like the construction of Figure 5.

In all of the gages illustrated the contact 24 of the indicator engages the indicator surface 15 preferably at one half of an inch from the center or axis of the stem so that any out-of-squareness is read as so many thousandths or ten thousandths of an inch per inch of diameter. If the distance is made one inch, then a dial for the indicator is selected having indications to read one unit per inch of diameter. The distance of the contact 24 from the center of the stem may be anything desired and it merely entails a selection of a proper dial on the indicator to give a reading of out-of-squareness per inch of diameter.

In all of the gages described, the surface to be gaged may be the surface on the test part itself such as S2 in Figure 5 or may be the surface 15 of the collar which transposes, or conforms to, the surface S1 of the test part. The ball and socket means as well as the spring mounting of Figure 1, provides a simple form of universal joint or mounting, any form of which may be used for mounting the collar on the stem. The universal mounting has at least two of the three functions first, of providing angular adjustability to bring the indicator surface 15 into parallelism with the surface to be tested for squareness; secondly, of assuring flat contact with the surface 14 so that alinement between the stem threads and the internal threads is assured; and thirdly, to apply pressure between the stem thread and internal thread.

The gage of Figures 1 to 4 illustrates a form of mounting for the indicator in which the indicator and its mounting means are primarily intended to rotate relatively to a fixed stem although for a small test part the test part may be rotated and the indicator held stationary. The constructions of Figures 5 and 6 illustrate a form intended primarily for a fixed indicator mounting means or base 57 and bracket 65, the stem and test part being rotatable relatively thereto. Broadly speaking one part is rotatable relatively to the other in all of the constructions.

The invention is presented to fill a need for improvements in a gage for testing squareness or centricity or both with respect to internal thread. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage for a test piece having a surface to be gaged with respect to a threaded hole comprising a stem having a thread carried thereby, a collar having a contacting surface at one end thereof, a ball and socket means mounting the collar on the stem with the center in the plane of the contacting surface for angular displacement with respect thereto and to apply axial pressure on the thread of the stem when threaded into the threaded hole, an indicator, means mounting the indicator for engagement with the surface to be gaged, and means mounting one of the parts including the stem and the indicator mounting means for rotation.

2. A gage for a test piece having a recessed surface to be gaged with respect to a threaded hole extending from the recessed surface comprising a stem having a thread carried thereby, a collar of a size insertable within the recess and having a contacting surface at the insertable end thereof and an indicator surface spaced from the contacting surface, the surfaces being parallel with each other, means mounting the collar on the stem for angular displacement with respect thereto and to apply axial pressure on the thread of the stem when threaded into the threaded hole, an indicator, means mounting the indicator for engagement with the indicator surface on the collar, and means mounting one of the parts including the stem and the indicator mounting means for rotation.

3. A gage for a test piece having a recessed surface to be gaged with respect to a threaded hole extending from the recessed surface comprising a stem having a thread carried thereby, a collar of a size insertable within the recess and having a contacting surface at the insertable end thereof, and an indicator surface spaced from the contacting surface, the surfaces being parallel with each other, a ball and socket means mounting the collar on the stem for angular displacement with respect thereto and to apply axial pressure on the thread of the stem when threaded into the threaded hole, an indicator, means mounting the indicator for engagement with the indicator surface, and means mounting one of the parts including the stem and the indicator mounting means for rotation.

4. A gage as in claim 3 in which the center of the ball and socket means is in the plane of the contacting surface.

5. A gage for a test piece having a recessed surface to be gaged with respect to a threaded hole extending from the recessed surface comprising a stem having a thread carried thereby, a collar of a size insertable within the recess and having a contacting surface at the insertable end thereof and an indicator surface spaced from the contacting surface, the surfaces being parallel with each other, means mounting the collar on the stem for angular displacement with respect thereto and to apply axial pressure on the thread of the stem when threaded into the threaded hole, an indicator, and means rotatively mounting the indicator on the stem for engagement of the indicator with the indicator surface.

6. A gage as in claim 5 in which the means mounting the collar on the stem is a ball and socket means.

7. A gage as in claim 6 in which the center of the ball and socket means is located in the plane of the contacting surface.

8. A gage for a test piece having a surface to be gaged with respect to a threaded hole comprising a stem having a thread carried thereby, a collar having a contacting surface at one end thereof to be engaged by the test piece, a ball and socket means mounting the collar on the stem for angular displacement with respect thereto and to apply axial pressure on the thread of the stem when threaded into the threaded hole, the center of the ball and socket means being in the plane of the contacting surface, an indicator, means including a base mounting the indicator for engagement with the surface to be gaged, and means rotatably mounting the stem on the base.

9. A gage as in claim 8 including a spring propelling the stem axially in its mounting.

10. A gage for a test piece having a recessed surface to be gaged with respect to a threaded hole extending from the recessed surface comprising a stem having a thread carried thereby, a collar of a size insertable within the recess and having a contacting surface at the insertable end thereof and an indicator surface spaced from the contacting surface, the surfaces being parallel with each other, the collar being loosely mounted on the stem for angular displacement with respect thereto, means to apply axial pressure on the thread of the stem when threaded into the threaded hole and to resiliently press the contacting surface against the surface to be gaged, said means including a spring engaging the collar, an indicator, and means rotatively mounting the indicator on the stem for engagement of the indicator with the indicator surface of the collar.

11. A gage as in claim 10 in which the means to apply axial pressure on the thread includes a stop nut insertable within the recessed hole to abut the stem.

References Cited in the file of this patent
UNITED STATES PATENTS

| | | |
|---|---|---|
| 2,366,394 | Gerber | Jan. 2, 1945 |
| 2,371,451 | Larson | Mar. 13, 1945 |
| 2,408,689 | Seme | Oct. 1, 1946 |